May 7, 1946.    D. B. BAKER ET AL    2,399,718
COTTON HARVESTER
Filed May 29, 1941    3 Sheets-Sheet 3

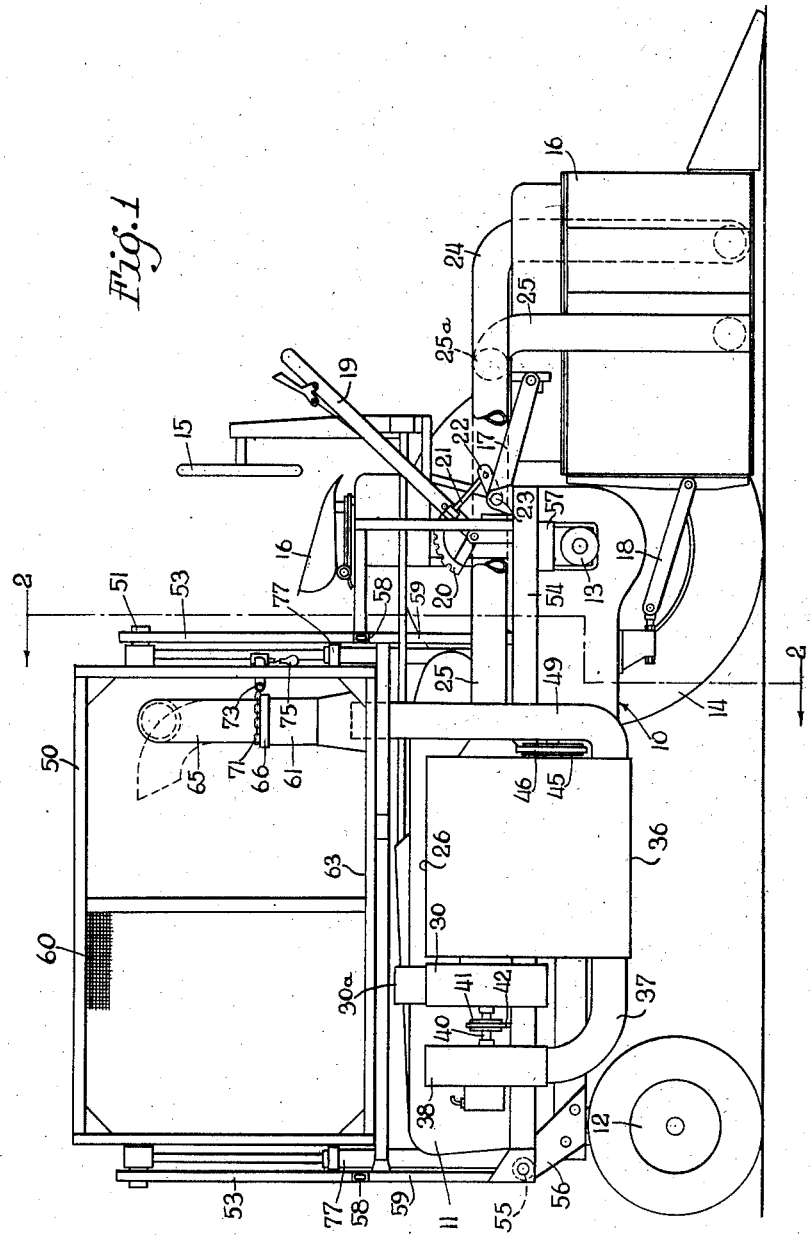

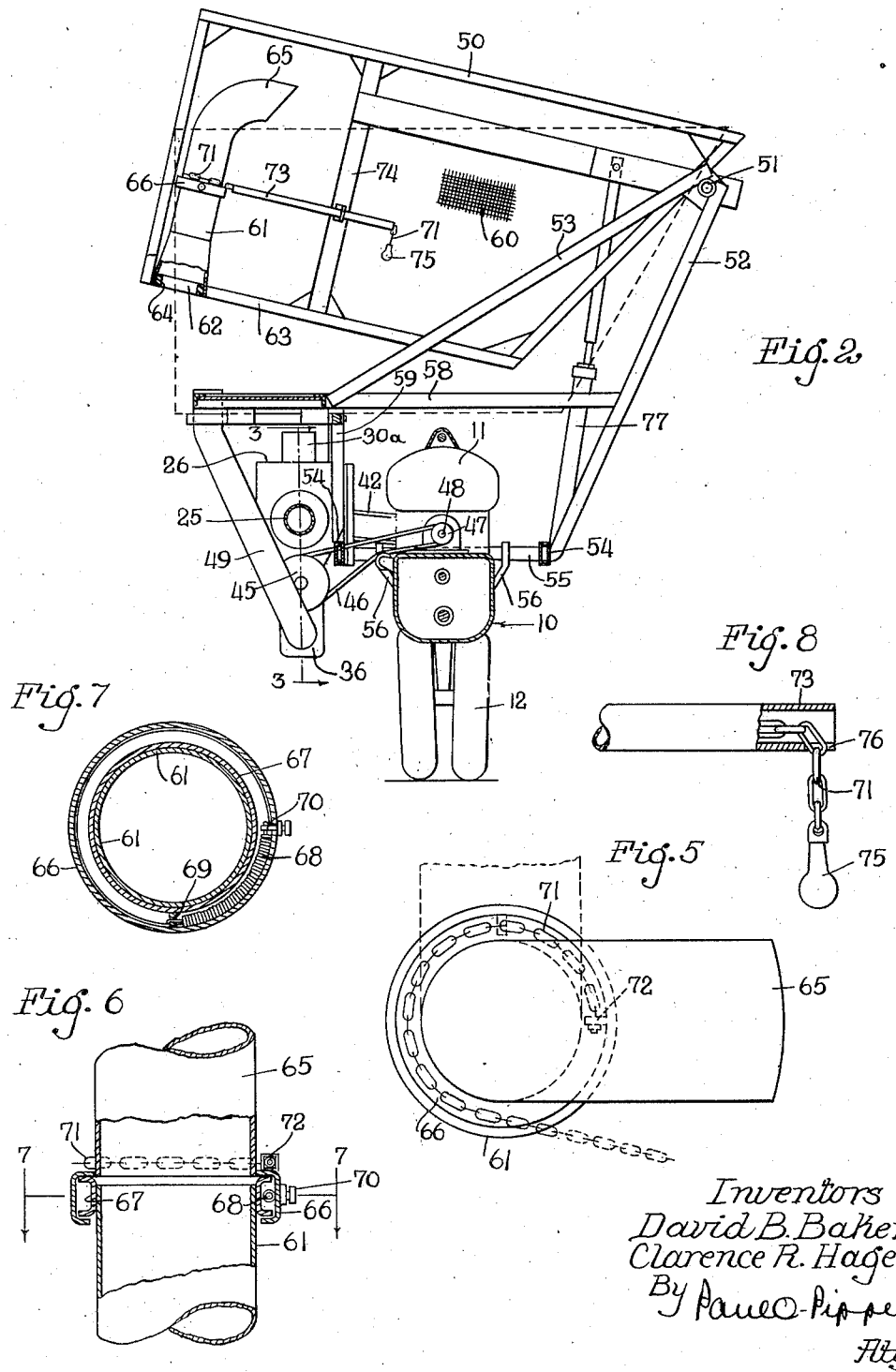

Inventors
David B. Baker
Clarence R. Hagen
By Paul O. Pippel
Atty.

Patented May 7, 1946

2,399,718

UNITED STATES PATENT OFFICE 2,399,718

COTTON HARVESTER

David B. Baker, Riverside, and Clarence R. Hagen, Chicago, Ill., assignors to International Harvester Company, a corporation of New Jersey Application May 29, 1941, Serial No. 395,813

8 Claims. (Cl. 56—14)

This invention relates to a cotton harvester. More specifically it relates to a tractor-mounted cotton harvester which includes conveying means for transferring cotton from cotton-picking mechanism to a receptacle carried on the tractor.

In tractor-mounted cotton harvesters, which include a receptacle for receiving cotton as it is picked, there is the problem of conveying the cotton from the cotton-picking mechanism to the receptacle. Normally this is accomplished by a conveying means which includes a fan over which the cotton passes. The present invention relates to a conveying means employing a fan, by which means the cotton is kept out of contact with the fan.

An object of the invention is to provide an improved cotton harvester.

A further object is the provision of an improved conveying system for a tractor-mounted cotton harvester.

Another object is to provide a tractor-mounted cotton harvester, which includes a conveying means employing a fan, for transferring cotton from the cotton-picking mechanism to a receptacle on the tractor.

Still another object is the provision of an improved conveying means on a tractor-mounted cotton harvester for directing cotton into a receptacle on the tractor.

According to the present invention, a cotton harvester is mounted on a tractor and includes cotton-picking mechanism and a receptacle for holding cotton as it is picked. There is a conveying means provided between the cotton-picking mechanism and the receptacle, which includes a pair of fans, one of which sucks the cotton into a chamber from the cotton-picking mechanism, and the other of which blows the cotton into the receptacle. The cotton comes into contact with neither of the fans. In a modified construction a single fan may be used. The conveying means also includes a discharge spout which extends into the receptacle and is angularly movable for discharge of the cotton into different parts of the receptacle.

In the drawings:

Figure 1 is a side view showing the cotton harvester of the present invention mounted upon the tractor;

Figure 2 is a sectional view taken along the lines 2—2 of Figure 1 but shows the receptacle slightly raised from the position of Figure 1;

Figure 5 is a detail view showing the discharge spout from the top;

Figure 6 is a detail view partially in section showing a mounting of the discharge spout;

Figure 7 is a sectional view taken along the line 7—7 of Figure 6;

Figure 8 is a detail view partially in section showing the control means for the discharge spout; and, Figure 9 shows a modified fan arrangement forming part of the conveying means.

Figure 4:
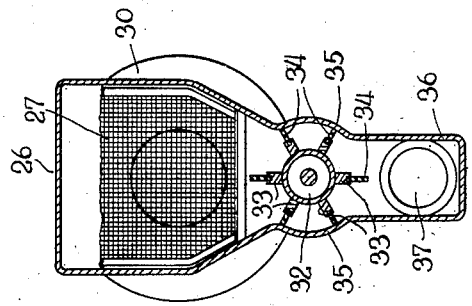
Figure 4 is a sectional view taken along the line 4—4 of Figure 3.

Reference character 10 designates a tractor of the tricycle type including a narrow body 11, front truck 12, rear axle 13, and rear wheels 14 of which only one is shown. The tractor also includes a steering wheel 15 and an operator's station 16 positioned in front of the steering wheel so that the tractor may be driven backwards. A cotton harvester 16 is mounted in the rear of the tractor by means of parallel links 17 and 18. The height of the picking mechanism 16 is controlled by a detent lever fixable in various positions to an arcuate toothed member 20 and acting upon the picking mechanism through a link 21 and arm 22, secured to a shaft 23 to which the link 17 is also secured. The cotton-picking mechanism is more fully shown in United States Patent No. 2,247,682. Conduits 24 and 25 extend from the cotton-picking mechanism 16, the conduit 25 joining the conduit 24 as at 25a. The conduit 25 extends into a housing 26 forming an enlarged chamber. A separator screen 27 is mounted therein so as to divide the chamber into a space 28 on the side of the screen away from the conduit 25 and a space 29 on the side of the screen toward the conduit 25. A fan housing 30 provided with an outlet 30a is at the one end of the chamber 28 and contains a fan 31. In the lower side of the chamber is mounted a rotatable closure member 32 which comprises a plurality of blade members 33 having extremities 34 formed of rubber adapted to contact curved parts 35 of the housing 26. Below the rotatable closure member 32 is an extension 36 of the housing 26. As viewed in Figure 3 a pipe section 37 extends from the left side of the extension 36 upwardly to a fan housing 38 containing a fan 39 mounted upon a shaft 40 upon which the fan 31 is also mounted. The shaft 40 has a pulley 41 secured thereto which is driven by a belt 42 driven in turn by a pulley 43 mounted upon a drive shaft 44 extending from the tractor body 11. The rotatable closure member 32 is driven by means of a pulley 45 and a belt 46, which, as shown in Figure 2, is driven by a pulley 47 mounted upon a drive shaft 48 extending from the tractor body 10. From the right end of the housing extension 36 a conduit 49 extends upwardly.

As seen in Figure 2, a receptacle 50 is mounted for movement from a receiving position to a dumping position about a pivot axis represented by the pipe 51. The pipe 51 is supported on frame members 52 and 53 at opposite ends of the tractor. The lower end of the members 52 is secured to a frame member 54 of rectangular section which is secured at the front end of the tractor to a circular pipe 55 secured to brackets 56 mounted upon the tractor body 10. The rear end of the frame member 54 is supported in the manner shown in Figure 1 for the support of another rectangular frame member 54 at the opposite side of the tractor. As seen in this figure, a bracket 57 carries the rear end of the rectangular frame member 54 over the rear axle 13. As seen in Figure 2, the rear supporting frame member 53 extends diagonally to a connection with a horizontal member 58, which is connected at that point to the upper end of a vertical frame member 59, connected at its lower end to the rectangular frame member 54 at the left side of the tractor. One end of the horizontal member 58 is secured to the member 53. The other end of the member extends beyond the vertical member 59. The front frame members 52 and 53 are supported similarly to the corresponding rear members. The front horizontal member 58 extends only as far as the front vertical member 59 instead of beyond it as in the case of the rear member 58. The receptacle has sides formed of metal screen 60. A conduit 61 extends upwardly from an opening 62 in the base 63 of the receptacle 50. Figure 2 shows in full lines the receptacle 50 slightly raised from its normal receiving position, shown in dotted lines, in which the conduit 61 engages the upper end of the conduit 49, a tight joint being formed between the two by a gasket 64 in the lower end of the conduit 61. Mounted upon the upper end of the conduit 61 is a discharge spout 65 which is angularly movable about the axis of the conduit 61 for directing a discharge of cotton from the spout into different parts of the receptacle 50. Figure 6 shows the mounting of the spout 65 on the conduit 61. An annular channel member 66 is secured to the upper end of the conduit 61 and is engaged by a somewhat similar annular channel member 67 secured to the lower end of the spout 65. The space between the annular channel members is for a compressible coil spring 68, which, as shown in Figure 7, has one end secured to the channel member 66 and thereby to the conduit 61 as at 69, and at the other end as at 70 to the channel member 67 and thereby to the discharge spout 65. The spring yieldingly holds the discharge spout in a certain angular position. As seen in Figure 5, a chain 71 is secured at 72 to the spout 65 and is partially wrapped around the spout and extends through a tube 73 secured to and extending through a frame member 74 forming part of the receptacle 50. The chain has a handle member 75 which is within easy reach of an operator on the seat 16. As seen in Figure 8, a slot 76 is provided to receive the chain 71 so that the spout may be held in any desired angular position.

In the operation of the cotton harvester the tractor is driven rearwardly, and cotton is picked by the mechanism 16. The fan 41 draws cotton from the picking mechanism 16 through the conduit 25 into the housing 26. Air and dirt in the cotton go through the screen 27 and out through the fan housing 30 and the outlet 30a. The cotton cannot pass the screen 27 and so stays in the space 29. The velocity of cotton and air because of the enlarged section of the housing 26 as compared with the conduit 25 is considerably reduced upon the arrival of the air and cotton in the housing. Thus, the cotton does not strike the screen with any great violence but falls upon the rotating closure member 32 and is passed through the closure member by resting in the pockets in the closure member formed by the blades 33. Upon arrival in the housing extension 36 the cotton is blown by the fan 39 up through the conduit 49, the conduit 61, and the discharge spout 65 into the receptacle 50. Though the air in the housing extension 36 is at a somewhat higher pressure than the air in the housing 26, because of the pressure exerted by the fan 39, the rotating closure member 32 prevents any very great quantity of air from flowing from the housing extension 36 to the housing 26. The advantage of the fan arrangement just described is that the cotton is kept out of contact with the fans, and a partial cleaning of the cotton takes place. As the receptacle 50 fills up with cotton the direction of discharge of the cotton is varied as desired by adjustment of the spout through the chain 71. When the receptacle is full, it is swung from the dotted line receiving position of Figure 2 to a dumping position in which it extends directly above the pivot axis represented by the pipe 51 and dumps into another receiving means positioned at the side of the tractor and not shown. Movement of the receptacle 50 from receiving position to dumping position is effected by means of fluid-power devices 77 connected to the receptacle. They comprise essentially a cylinder and a piston and are operated by fluid under pressure received from the tractor. They are not shown in detail since they form no part of the present invention.

Figure 9:
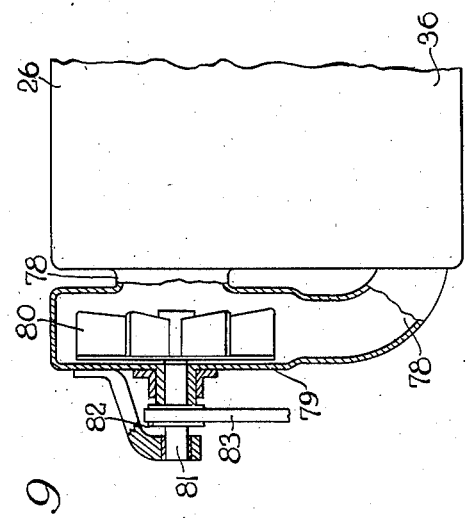

In the modified form of Figure 9, the housing 26 has two outlets 78 which are connected to a housing 79 containing a single fan 80, which serves both for the sucking of cotton and air into the housing and for the forcing out of the cotton in the housing extension 36 under pressure. The fan 80 is driven by a shaft 81 driven by a pulley 82 mounted thereon and a belt 83 connected with a tractor in a manner similar to the manner shown in Figure 3. With the single fan of Figure 9, the same essential operation is present as in the case of the two fans 81 and 39; that is, the sucking in of the air and cotton to a certain point and the further movement of the cotton by pressure exerted thereon so that the cotton does not come into contact with the fan.

Figure 3:
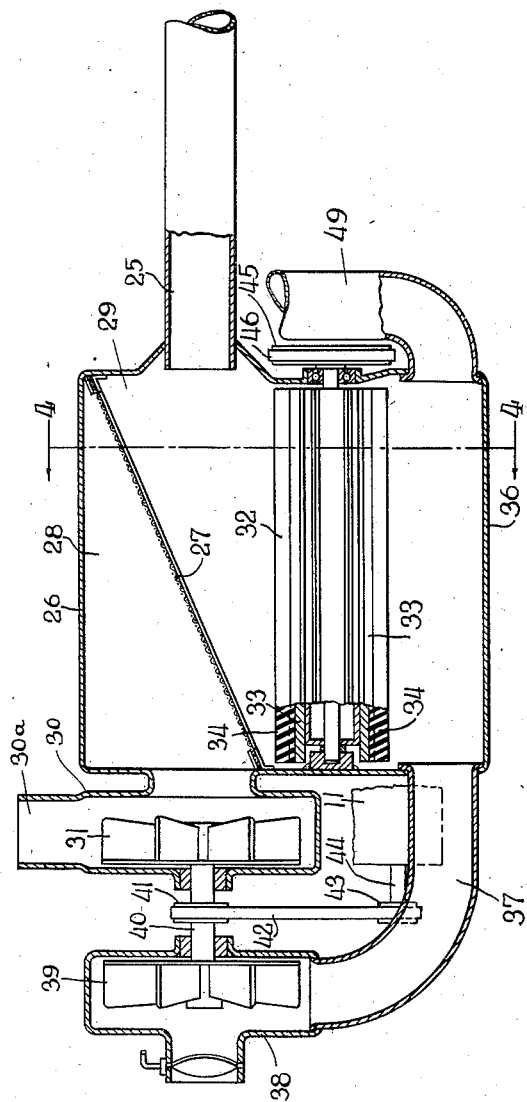
Figure 3 is a sectional view taken along the line 3—3 of Figure 2.

It will be apparent from the foregoing description that a new and novel cotton harvester, according to which the cotton is conveyed in a novel manner, is shown in either Figures 3 or 9, and cotton is directed into a receptacle by means of a conduit forming part of the conveying system, the conduit being secured to the base of the receptacle and being movable therewith when the receptacle moves from receiving position to dumping position. The conduit has a discharge spout which is adjustable for directing discharge of cotton into different parts of the receptacle by means of a control element which is within easy reach of an operator on the tractor seat.

The intention is to limit the invention only within the scope of the appended claims.

What is claimed is:

1. In a dumpable crop-receiving receptacle movable between receiving and dumping positions upon a harvesting vehicle having a crop delivery conduit; the combination of a wall having an inlet opening communicable with said conduit when the receptacle is in its receiving position and separable from said conduit pursuant to movement of the receptacle into its dumping position, a discharge spout in communicative registry with said inlet opening and projecting into said receptacle, and means mounting the discharge spout for movement with respect to the receptacle for directing the crop from said conduit to various points in the receptacle.

2. In a dumpable crop-receiving receptacle movable between receiving and dumping positions upon a harvesting vehicle having a crop delivery conduit; the combination of a wall having an inlet opening communicable with said conduit when the receptacle is in its receiving position and separable from said conduit pursuant to movement of the receptacle into its dumping position, a pipe extending upwardly into the receptacle from said opening, a discharge spout, means mounting the spout on the upper end of said pipe for pivotal movement with respect thereto about the axis thereof to discharge the crop to various points in the receptacle, and resilient means yieldingly resisting the aforesaid pivotal movement of the spout.

3. In a dumpable crop-receiving receptacle movable between receiving and dumping positions upon a harvesting vehicle having a crop delivery conduit; the combination of a wall having an inlet opening communicable with said conduit when the receptacle is in its receiving position and separable from said conduit pursuant to movement of the receptacle into its dumping position, a pipe extending upwardly into the receptacle from said opening, a discharge spout, means mounting the spout on the upper end of said pipe for pivotal movement with respect thereto about the axis thereof to discharge the crop to various points in the receptacle, a spring secured at one end to said pipe and at the other end to the spout and extending partially about one of them, and means enclosing the spring, whereby movement of the spout with respect to the pipe causes discharge of the crop to different points in the receptacle, and the spring urges the spout to one position with respect to said pipe.

4. In a dumpable crop-receiving receptacle movable between receiving and dumping positions upon a harvesting vehicle having a crop delivery conduit; the combination of a wall having an inlet opening communicable with said conduit when the receptacle is in its receiving position and separable from said conduit pursuant to movement of the receptacle into its dumping position, a pipe extending upwardly into the receptacle from said opening, a discharge spout, means mounting the spout on the upper end of said pipe for pivotal movement with respect thereto about the axis thereof to discharge the crop to various points in the receptacle, resilient means yieldingly resisting the aforesaid pivotal movement of the spout, a guide tube secured to the receptacle, and a flexible control element secured to the spout and extending through the tube for pivoting the spout when pulled upon and for causing the resilient means to impart retrograde pivotal movement to said spout when such control element is released.

5. In a dumpable crop-receiving receptacle movable between receiving and dumping positions upon a harvesting vehicle having a crop delivery conduit and an operator's station; the combination of a crop-conducting pipe extending upwardly into said receptacle and movable therewith to dispose its lower end in communicative registry with said conduit when the receptacle is in its receiving position and to separate from said conduit when the receptacle is moved into its dumping position, a discharge spout, means mounting said spout on the upper end of said pipe for pivotal movement with respect thereto about its axis to discharge the crop to various points in the receptacle, resilient means yieldingly resisting the aforesaid pivotal movement of the spout, a guide tube secured to the receptacle and extending along a side thereof to a position in proximity to the operator's station, and a flexible control element secured to the spout and extending through said tube into convenient access to an operator at said station, said flexible element being operable when pulled upon by such operator for pivoting the spout and operable, when released, to cause said resilient means to impart retrograde pivotal movement to said spout.

6. In combination: a tractor having front and back ends and including an engine; a cotton picking mechanism mounted on an end of said tractor; a cotton-receiving receptacle mounted on the tractor over said engine; a power-driven separating unit mounted on a side of the tractor opposite to the engine, said separating unit including a casing having suction and pressure compartments each having an inlet opening and an outlet opening, a suction fan associated with the outlet opening of the suction compartment for inducing air into such compartment through its inlet opening and out of such compartment through its outlet opening, a foraminous separating member in the suction compartment between the inlet and outlet openings thereof to separate cotton from the air induced into such compartment, cotton transferring and sealing means disposed between said compartments to prevent direct communication therebetween and operable to transfer the separated cotton from the suction compartment to the pressure compartment, a pressure fan associated with the inlet opening of the pressure compartment for forcing air into such pressure compartment through said opening and thus forcing the air and transferred cotton out through the pressure compartment outlet opening; means for driving said fans and said transferring and sealing means from the tractor engine; a suction conduit communicative between the picking mechanism and the suction compartment inlet opening to introduce air and cotton into such compartment from such mechanism; and a pressure conduit communicative between the pressure compartment outlet and the receptacle for conducting the cotton from the separator unit into said receptacle.

7. In a fan-operated apparatus for conveying a fluid-propelled substance in a manner preventing engagement of the substance with fan-rotating parts of the apparatus, the combination of a casing having suction and pressure compartments each having an inlet opening and an outlet opening, a suction fan associated with the outlet opening of the suction compartment for inducing fluid and substance propelled thereby into such compartment through its inlet opening and for causing discharge of such fluid from the compartment through its outlet opening, a foraminous separating member in the suction compartment between the inlet and outlet openings thereof to prevent discharge of the coarser of said substance with the fluid through said outlet opening, material transferring and sealing means disposed between said compartments to prevent direct communication therebetween and operable to transfer the substance stopped by the foraminous member from the suction compartment into the pressure compartment, and a fan disposed for forcing different fluid inwardly through the inlet opening of the pressure compartment and outwardly through the outlet opening thereof to discharge the transferred substance from said pressure compartment.

8. In a fan-operated apparatus for conveying cotton in a manner preventing engagement of the cotton with the fan-rotating parts of the apparatus, the combination of a casing having suction and pressure compartments each having an inlet opening and an outlet opening, a foraminous cotton-separating partition in the suction compartment between its inlet and outlet openings, cotton transferring and sealing means disposed between said compartments to prevent direct communication therebetween and operable to transfer cotton separated by the foraminous partition from the suction compartment into the pressure compartment, a pair of fans having coaxial rotors, and a common drive shaft for said rotors, one of said fans being communicative with the outlet opening of the suction compartment to cause airflow through such compartment inwardly through its inlet opening and outwardly through its outlet opening, and the other of said fans being communicative with the inlet opening of the pressure compartment for forcing different air into said compartment and outwardly thereof through its outlet opening for conducting the transferred cotton therewith.

DAVID B. BAKER.
CLARENCE R. HAGEN.